US010873829B2

(12) United States Patent
Lobo et al.

(10) Patent No.: US 10,873,829 B2
(45) Date of Patent: Dec. 22, 2020

(54) WEB MAPPING DISTANCE DETERMINATION USING CACHE

(71) Applicant: General Electric Company, Schenectady, NY (US)

(72) Inventors: Boniface Lobo, Pleasanton, CA (US); Daniel Bennett, Pleasanton, CA (US)

(73) Assignee: General Electric Company, Schenectady, NY (US)

( * ) Notice: Subject to any disclaimer, the term of this patent is extended or adjusted under 35 U.S.C. 154(b) by 389 days.

(21) Appl. No.: 15/813,465

(22) Filed: Nov. 15, 2017

(65) Prior Publication Data

US 2019/0149951 A1    May 16, 2019

(51) Int. Cl.
*H04W 4/02* (2018.01)
*G06F 16/29* (2019.01)
*G06F 16/957* (2019.01)
*G06Q 50/10* (2012.01)

(52) U.S. Cl.
CPC .......... *H04W 4/023* (2013.01); *G06F 16/29* (2019.01); *G06F 16/9574* (2019.01); *G06Q 50/10* (2013.01)

(58) Field of Classification Search
CPC ...... H04W 4/023; G06F 16/957; G06F 16/29; G06Q 50/10
See application file for complete search history.

(56) References Cited

U.S. PATENT DOCUMENTS

2017/0192981 A1*  7/2017  Glover ................ H04L 67/2842

* cited by examiner

*Primary Examiner* — Thomas G Black
*Assistant Examiner* — Ana D Thomas
(74) *Attorney, Agent, or Firm* — Buckley, Maschoff & Talwalkar LLC (57) ABSTRACT

The example embodiments are directed to a system and method which can reduce the number of requests to a web mapping service. In an example, the method may include receiving a processing request from a field service software application for a route distance between a source field service location and a target field service location, identifying a sub-area of the web map in which the source field service location is located and a sub-area of the web map in which the target field service location is located, approximating the route distance between the source field service location and the target field service location based on a previously determined distance between a representative point of the sub-area which includes the source field service location and a representative point of the sub-area which includes the target field service location, and outputting route guidance based on the approximate route distance.

18 Claims, 7 Drawing Sheets

WEB MAPPING DISTANCE DETERMINATION USING CACHE

BACKGROUND

Machine and equipment assets are engineered to perform one or more tasks as part of a business process. For example, assets can include, among other things and without limitation, industrial manufacturing equipment on a production line, drilling equipment for use in mining operations, wind turbines that generate electricity on a wind farm, transportation vehicles such as trains and aircraft, and the like. As another example, assets may include devices that aid in diagnosing patients such as imaging devices (e.g., X-ray or MRI systems), monitoring equipment, and the like. The design and implementation of these assets often involves both the physics of the task at hand, as well as the environment in which such assets are configured to operate.

Over time, hardware components of an asset can experience wear and tear and software components can require updates and replacement. In some instances, assets can even experience hardware or software failures and system breakdowns. To address these issues, many manufacturers and third parties provide field service to ensure and maintain performance of an asset. Field service can include maintenance, updates, and repairs which are performed by or otherwise under the control of a field technician. Field service can be facilitated through software, but such traditional approaches of using field service software rely heavily on human intervention. For many technicians, the field service software is downloaded to a mobile client device (e.g., tablet, laptop, smartphone, etc.) at the beginning of the day or at the start of a work order, and is updated as the technician progresses through tasks.

The field service software may assist a technician to successfully complete work orders and access customer data. While the field service software has simplified the access to field service data, the field service software has a number of limitations. For example, field service software traditionally uses a human operator at the back-end to make decisions which technicians are then responsible for performing. For example, a person/operator may determine which technician to assign to each task, and also prepare a travel route for a technician through human activities (e.g., pen and paper) which is subject to the "best-guess" of the person. This problem is compounded for organizations that have dozens or even hundreds of technicians that require task assignments and routes on a daily basis.

SUMMARY

Embodiments described herein improve upon the prior art by providing a web-based field service schedule optimizer for a cloud-based field service software application. The optimizer can approximate the distance between a start field service point and an end field service point on a web map using previously cached distance determinations of a similar start point and a similar end point thereby reducing the number of communications requests being made to a web mapping service. The previously cached determinations may not be an exact match to the current request but they may be close enough that an accurate travel distance can be determined. For example, the start point of the previous determination may be within a predetermined distance (e.g., same sub-area) of the start point of the current request. In addition, the end point of the previous determination may be within a predetermined distance (e.g., same sub-area) of the end point of the current request. By approximating the distance between two points on a web map using a previously determined distance between similar points on the web map, the optimizer can reduce the number of mapping requests that are sent to the web mapping service while maintaining accuracy of the distance determinations.

In an aspect of an example embodiment, a computer-implemented method includes one or more of receiving a processing request from a field service software application for a route distance between a source field service location and a target field service location on a geographical web map, identifying a sub-area of the geographical web map in which the source field service location is geographically located and a sub-area of the geographical web map in which the target field service location is geographically located, approximating the route distance between the source field service location and the target field service location based on a previously determined distance between a representative point of the sub-area which includes the source field service location and a representative point of the sub-area which includes the target field service location, and outputting route guidance to the field service software application based on the approximate route distance between the source field service location and the target field service location in response to the request.

In an aspect of another example embodiment, a computing system includes one or more of a processor that may receive a processing request to determine a distance between a source location and a target location on a geographical web map, identify a sub-area of the geographical web map in which the source location is geographically located and identify a sub-area of the geographical web map in which the target location is geographically located, and approximate the distance between the source location and the target location based on a previously determined distance between a representative point of the sub-area of the source location and a representative point of the sub-area of the target location, and an output that may output the approximate distance between the source location and the target location in response to the request.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Example embodiments are directed to a system (e.g., application, service, code, program, etc.) and hardware that can provide route guidance by approximating a route distance between a source geographical point and a target geographical point on a web map using previously stored distance determinations between a similar source point and a similar target point. The software may be implemented with or otherwise be in communication with a web mapping service that may be included in a scheduling application of a field service software. The system can reduce the number of distance determination requests being made to the web mapping service by generating and re-using approximate distances between a source field service location and a target field service location. The distance may include an amount of space between two points (e.g., feet, meters, kilometers, miles, etc.) and may include an amount of time (e.g., seconds, minutes, hours, days, etc.). That is, the distance may refer to a geographical distance between two geographical points (e.g., 1 km, 1 mile, etc.), an amount of time it would take to travel between two geographical points (e.g., 1 minute, 5 minutes, 1 hour, etc.) Also, in some embodiments, the amount of time may be determined based on current travel conditions for a given point of time or a given day.

The system may be used in conjunction with a scheduling function (e.g., an optimizer) of a field service software application that requires many different distances to identify and assign an optimal technician to perform each field service task from among a plurality of technicians, determine an optimal schedule and order for a plurality of field service events/tasks assigned to each technician, and the like. For example, a service technician may be assigned a few dozen field-service related tasks by the optimizer which are to be performed during a predetermined period of time such as day, a week, etc. The field service tasks may be dispersed at different locations. During a pre-processing step, the optimizer may build a grid that divides a geographical area into cells (or sub-areas) and which further includes representative points within each cell in the grid. During a subsequent phase, the optimizer may access the grid when determining distances between geographical locations which are to be traveled to by a technician. When a route distance request is received from the scheduling application, a distance between a representative point in a first sub-area and a representative point in a second sub-area on the grid developed during the pre-processing phase may be retrieved from a local storage rather than querying the web mapping service for an actual route distance between the two geographical points. Accordingly, the previously determined distance may be used to approximate the route distance.

As described herein, a representative point may be an arbitrary point (e.g., centroid, etc.) of the sub-area. The distance determined between the representative points may be stored in a cache and made accessible for a period of time through the cache. When a subsequent request is received for a route distance between an actual start point within the first sub-area and an actual end point within the second sub-area, the system can check the cache and determine whether a similar distance has already been determined between two representative points of the first sub-area and the second sub-area. When a previous route distance has already been determined between two representative points and stored locally, the software can retrieve the previously stored distance and approximate a distance between the actual start point and the actual end point received in the second request using the previously cached distance between the representative points.

The previously determined distance may be stored in the cache for a predetermined period of time. When the predetermined period of time has elapsed, or there is no more space left in the cache, the previously determined distance may be moved from the cache to a database or other storage that has more space but which is slower. When distance determination requests are received such as when the optimizer is building its initial distance matrix (grid), the software may check the cache for a previously determined distance in an effort to approximate the distance. If the distance is not stored in the cache, the software may check the database next only if the cache does not have the previously determined distance. If a previously determined distance is not stored in either of the cache or the database, the service may query the web service to perform an actual determination of the distance to calculate an exact distance between the start point and the end point on the web map. The actual determination may be a last resort however, and only used when previous requests are not present in either the cache or the database (e.g., when memory has been flushed). Furthermore, each time the service is required to determine a distance, the service can store the determined distance within the cache and the database to make the distance accessible to future requests.

As mentioned, the software described herein may be incorporated within or used in conjunction with field service software that provides a technician with a field schedule for performing various duties such as maintenance, repairs, part-replacement, cleaning, inspecting, and the like, at various locations. Implemented within the field service software is an optimizer that may identify an optimal technician for each scheduled task, and also provide each technician with an optimal travel schedule. The software may also provide the technician with instruction manuals, work orders, parts lists, signed documents, location-based maps, and the like. For example, the field service software application may be executed by the client device operated by the technician and may provide a user interface that enables consistent access and targeted service workflows for a group of technicians out in the field and interacting with the same back-end mobile application database file. Through the field service software, the technician can successfully complete complex work orders, present service reports for customer signature, and provide dynamic pricing of labor, parts and products. Furthermore, as updates are made by other technicians to the back-end database, and updates are made by a technician to a local database, the sync gateway can merge the changes, perform conflict resolution, and update both the back-end database and the local client database accordingly.

As cloud-based computing and industrial manufacturing continue to merge, service-based software is becoming more integrated within a cloud environment. Field technicians may rely on a field service software application as described herein to provide comprehensive, cloud-based, and mobile enterprise solutions for managing tasks of a technician, and collecting and storing necessary materials and documents for use by the technician such as work orders, parts lists, instruction manuals, client authorizations, and the like. Field service software can help manufacturers and service providers to grow service revenues, increase service efficiencies, improve customer experience, and address compliance requirements. Another aspect of the field service software according to various embodiments is that it can provide a technician with route guidance between field service locations of a schedule. (e.g., a day, week, etc.).

On a given day, a technician can be assigned field service tasks (e.g., a few to more than a dozen work orders) while also having other obligations to attend such as training, overnight lodging, and the like. Each order/event can have constraints associated therewith such as a geographical location, a time at which the work must be completed, a time at which the location is unavailable, and the like. As a result, determining an optimum daily schedule for a technician can be difficult. To perform such determinations, the optimizer described herein often takes into account geographical locations, time constraints, technician expertise (skills), availability of equipment, customer preferences for individuals, and the like, to identify a technician for performing a group of field service tasks for a day or other period of time, and attempts to find an optimum travel route and order for the technician to accomplish the jobs, training, lodging, etc., at different field service locations. When determining the travel route, the optimizer may rely on a web mapping service. In order to find the most optimal route/order, the optimizer can perform a brute-force calculation or semi-randomized calculation that calculates many different possible routes/orders and selects the best case. However, web mapping services often have limits in the amount of requests that can be processed over a given period of time. To reduce the number of requests that are being made to the web mapping service, the field service software described herein may use previously determined distance approximations which are built during a pre-processing step and stored in a cache.

The field service software and route approximation system herein may be used in conjunction with applications for managing machine and equipment assets and can be hosted within an Industrial Internet of Things (IIoT). In an example, an IIoT connects assets, such as turbines, jet engines, locomotives, healthcare devices, and the like, to the Internet or cloud, or to each other in some meaningful way such as through one or more networks. The software described herein can be implemented within a "cloud" or remote or distributed computing resource. The cloud can be used to receive, relay, transmit, store, analyze, or otherwise process information for or about assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of machine and equipment assets with the remote computing resources to enable the IIoT often presents technical challenges separate and distinct from the specific industry and from computer networks, generally. A given asset may need to be configured with novel interfaces and communication protocols to send and receive data to and from distributed computing resources. Given assets may have strict requirements for cost, weight, security, performance, signal interference, and the like such that enabling such an interface is rarely as simple as combining the asset with a general-purpose computing device.

The Predix™ platform available from GE is a novel embodiment of such an Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of industrial or healthcare based assets can be uniquely situated to leverage its understanding of assets themselves, models of such assets, and industrial operations or applications of such assets, to create new value for industrial customers through asset insights. Furthermore, the field service software including the schedule optimizer described herein may be hosted by or otherwise in communication with an AMP.

Figure 1:
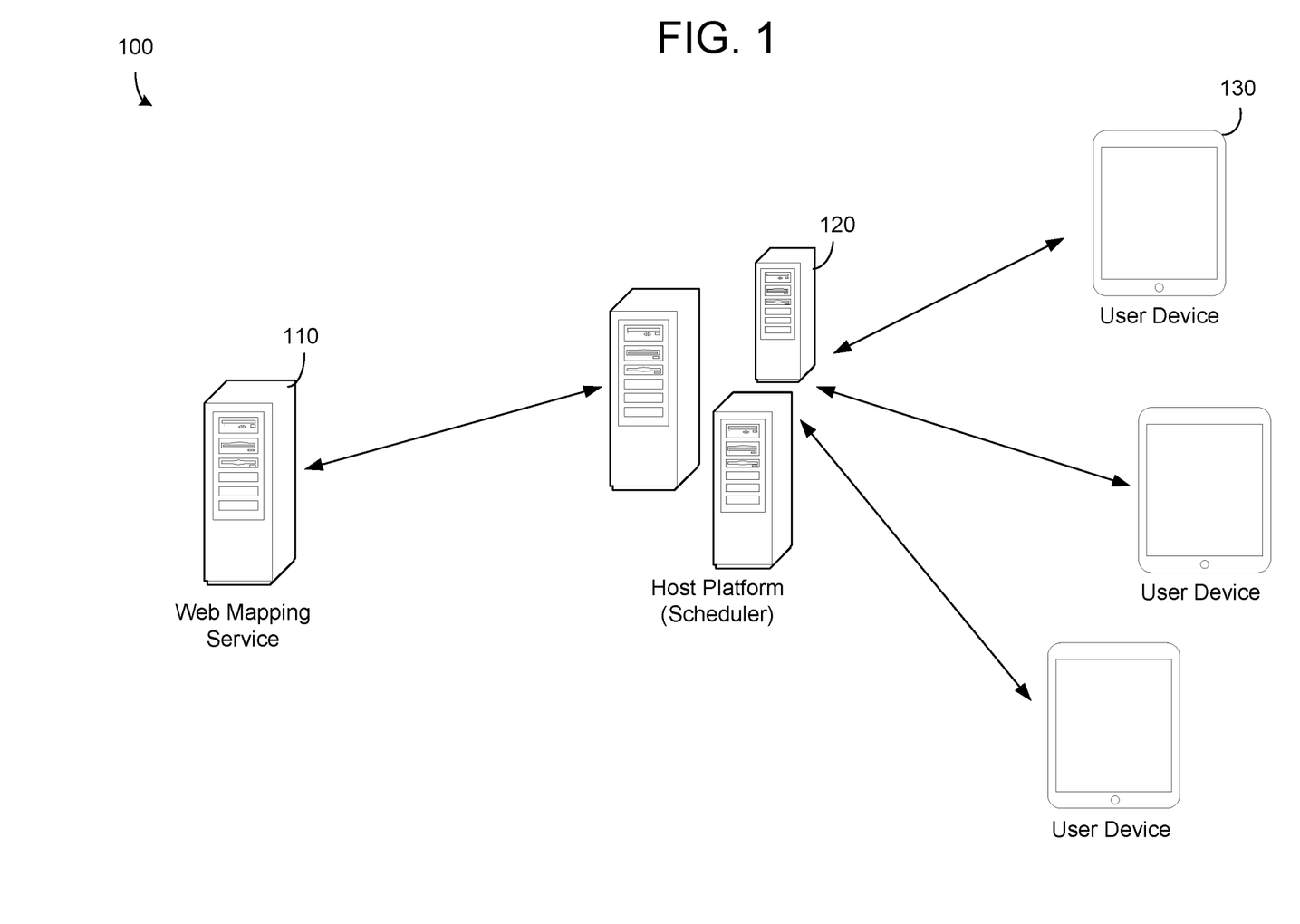
FIG. 1 is a diagram illustrating a system for determining a distance from a web map in accordance with an example embodiment.

FIG. 1 illustrates a system 100 for determining a distance from a web map in accordance with an example embodiment. Referring to FIG. 1, the system 100 includes a web mapping service host server 110, a host platform 120 (e.g., cloud, server, database, etc.), and user devices 130 (e.g., tablet, mobile phone, notebook, laptop, computer, appliance, kiosk, etc.), which are connected to each other via a network such as the Internet, private network, or the like. The host platform 120 may host a scheduling application such as used for field service scheduling. Meanwhile, the user devices 130 may correspond to technician devices that can download schedules and other information from the scheduling application hosted by the host platform 120. The scheduling application may use brute force calculations when determining an optimal schedule for a technician. The brute force calculations may require thousands or even tens of thousands of iterations with each iteration including thousands of distances being calculated from a web map provided by the web mapping service server 110.

In operation, a user such as a technician may issue a request via a user device 130 for a daily schedule from the host platform 120. As a non-limiting example, the host platform may include multiple systems such as a host server that hosts a field service management suite of applications and a cloud platform that hosts the schedule optimization engine. In this example, the user device 130 may communicate with the field service software host to sync changes from the field (in the tech's schedule, work order completion status, location, etc.) with the server. The optimization engine may also sync it's scheduling changes with host server, and the user device 130 may receive those changes from host server rather than the optimizer, directly. The optimizer may identify and assign one or more tasks or events that are to be performed by a technician. Each event requires the optimizer to generate a route such as a route between a previous task and a next task, etc. The scheduling application may generate a travel route including an order and a time at which the user should arrive at each task or event based on geographical locations of the tasks and constraints associated with each task such as available times, etc. To generate the travel route, the scheduling application may access a web mapping service 110 to generate a distance between points along the route. Based on the distance and times between points on the route, the scheduling application may determine an optimal route (e.g., fastest, least distance, cost conservative, etc.) for performing the tasks. However, as further described herein, the web mapping service may identify a previously stored approximate distance rather than use an actual distance queried from the web mapping software.

The web mapping service hosted by web mapping server 110 may be a geographic information system (GIS) application based on a standard protocol for serving (over the Internet) georeferenced map images which a map server generates using data from a geographic information system (GIS) database. GIS applications are tools that allow users to create interactive queries (user-created searches), analyze spatial information, edit data in maps, and present the results of all these operations. The web mapping service may have a limit on the amount of page requests it can handle from a particular user (e.g., IP address, API key, device ID, etc.) over a predetermined period of time. When a user reaches the maximum page requests the web mapping service may create a timeout or a delay when responding to a request for a distance from the user. To address this issue, the system 100 incorporates software and hardware to reduce the number of page requests received by the web mapping service. For example, a program may be executing on the host platform 120, the web mapping service, or a combination thereof, and may store previously determined distances generated by the web mapping service in a cache, database, or other storage that is easily accessible. The system may also batch together many point pairings for which the distance between is to be requested into a single bulk request to the mapping service. Requiring a web service to calculate each of the distance requests in the batch can be a significant load on the system.

When a distance request is generated by the scheduling application executing on the host platform 120, the program can check a local storage (e.g., a cache) which may be included in the host platform 120, an external storage, and the like, for a previously determined distance that is similar (i.e., an approximate) to the requested distance, and use the previously determined distance as an approximate for the requested distance without requesting/querying the web mapping service to perform a distance determination. That is, rather than execute a processing query on the web mapping service to determine a distance between two locations, the system herein can determine the distance based on previous distance determinations. Although the example of FIG. 1 shows the web mapping service being separate from the host server 120, it should be appreciated that the web mapping service and the scheduling application may be hosted on a common platform or combined into the same software application or suite of applications.

Current scheduling applications may use a Haversine algorithm to find a distance between two geographical locations. The Haversine algorithm may compute a straight line distance between the two geographical locations (i.e., points) considering the curvature of the Earth. However, for a real driving distance this is unsuitable especially when a route includes turns, curves, obstacles, etc. Furthermore, using a Geographical Information Service (GIS) such as GOOGLE® MAPS in each job run is not feasible due to the amount of computation required, the amount of requests supported by the web mapping service over a predetermined period of time, increasing costs for usage, and the like.

The example embodiments provide a mechanism that solves the drawbacks of current scheduling applications by partitioning a geographical space into latitude and longitude grids. The distance between a pair of cells in the grid may be pre-fetched from a GIS server and used as an approximation of a distance between two geographical locations within the pair of cells, respectively. In a situation where the two geographical locations are within the same cell, the grid can be further divided into smaller sized partitions or cells until the geographical locations are no longer within the same cell.

Figure 2:
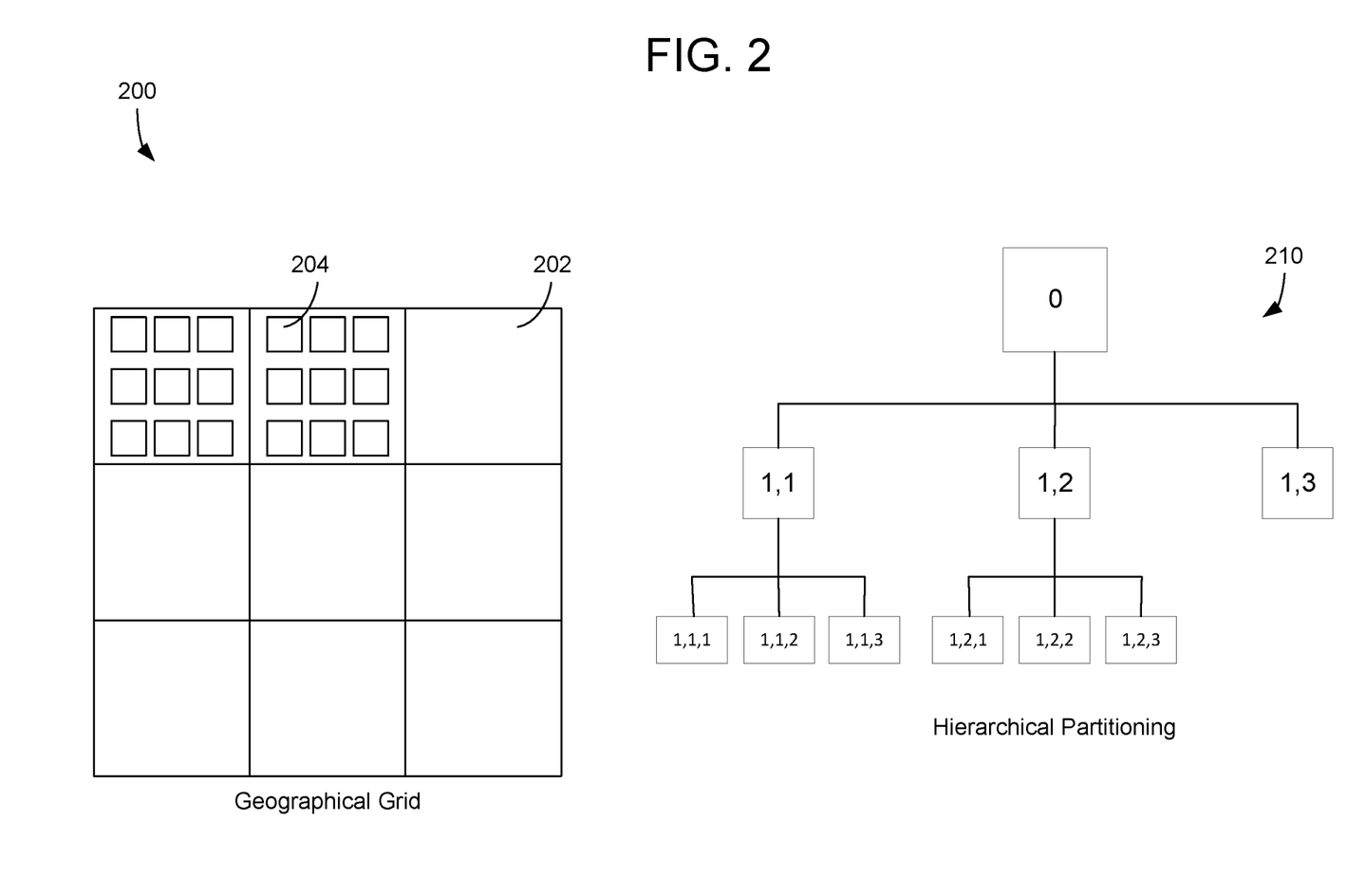
FIG. 2 is a diagram illustrating a process of partitioning a geographical space into a latitude and longitude grid in accordance with an example embodiment.

FIG. 2 illustrates a process 200 of partitioning a geographical space into a latitude and longitude grid in accordance with an example embodiment. The process 200 may be performed by the field service software optimizer as a pre-processing step prior to determining an optimum technician and route for each technician. Referring to FIG. 2, in the process 200, the service partitions the geographical space 200 into a grid of initial cells 202 having a predetermined size. The cells 202 may also be referred to as sub-areas. Here, the initial partitioning results in nine cells being used for the grid of the web map. The grid contains the actual driving distance between cells at each level. A representative point within each cell may be used when determining a distance between two cells on the grid. The representative points may be determined from previous distance determinations performed by the web mapping service or it may be arbitrarily set by the service such as a centroid, etc. The distances between the representative points are used to build a matrix which can be used during subsequent optimization scheduling steps. Accordingly, when the optimizer requests a distance between two points (i.e., from two separate cells on the grid 200), the service may fetch the previously determined distance between the two representative points of those cells and use that distance as an approximation for the actual distance between the two points.

In an example in which two points are located in the same cell, the service can further define/refine the cells by dividing each cell into smaller cells. An example of a partitioning the grid is shown in 210. Here, the grid maintains a hierarchical partition of cells where each cell can be further divided into smaller cells. In the example of FIG. 2, the cell 202 is divided into nine smaller cells 204. In total, the grid 200 which includes nine cells 202 is divided into a grid including eighty-one smaller cells 204. By dividing the cells into smaller cells, the strategy allows for better control over close distance approximations error without causing the number of cells and distance pairs to increase exponentially.

For every pair of geographical locations that need a distance determination to be performed, the service identifies a corresponding cell on the grid for each geographical location. If the two locations belong to different cells, a pre-computed distance between representative points of those cells are used as an approximate distance between the two geographical locations. However, if the two locations are included in the same cell, the grid may be further divided (or the cell may be further divided) into smaller cells.

In these examples, the error between the actual distance and the computed distance (i.e., approximated distance) is at most a diameter of the cell that the geographical points belong to. The computation of the distance between a pair of geographical points may be computed as follows:
1) A distance between the pair of locations may be computed using Haversine to decide what level of the grid to query (i.e., how many grid divisions are needed).
2) In this example, if the Haversine distance is between a configured range for the job, a level 2 (smaller cell) distance may be used from the cache.
3) If the Haversine distance is greater than a configured threshold, a level 1 (large cell) distance may be used from the cache.
4) For a distance smaller than a configured minimum threshold, the query may go to a GIS service such as a web mapping service.
5) Also, if a distance between geographical locations is not available on the grid, the distance can be queried from the GIS and populated on the grid.

Figure 3A:
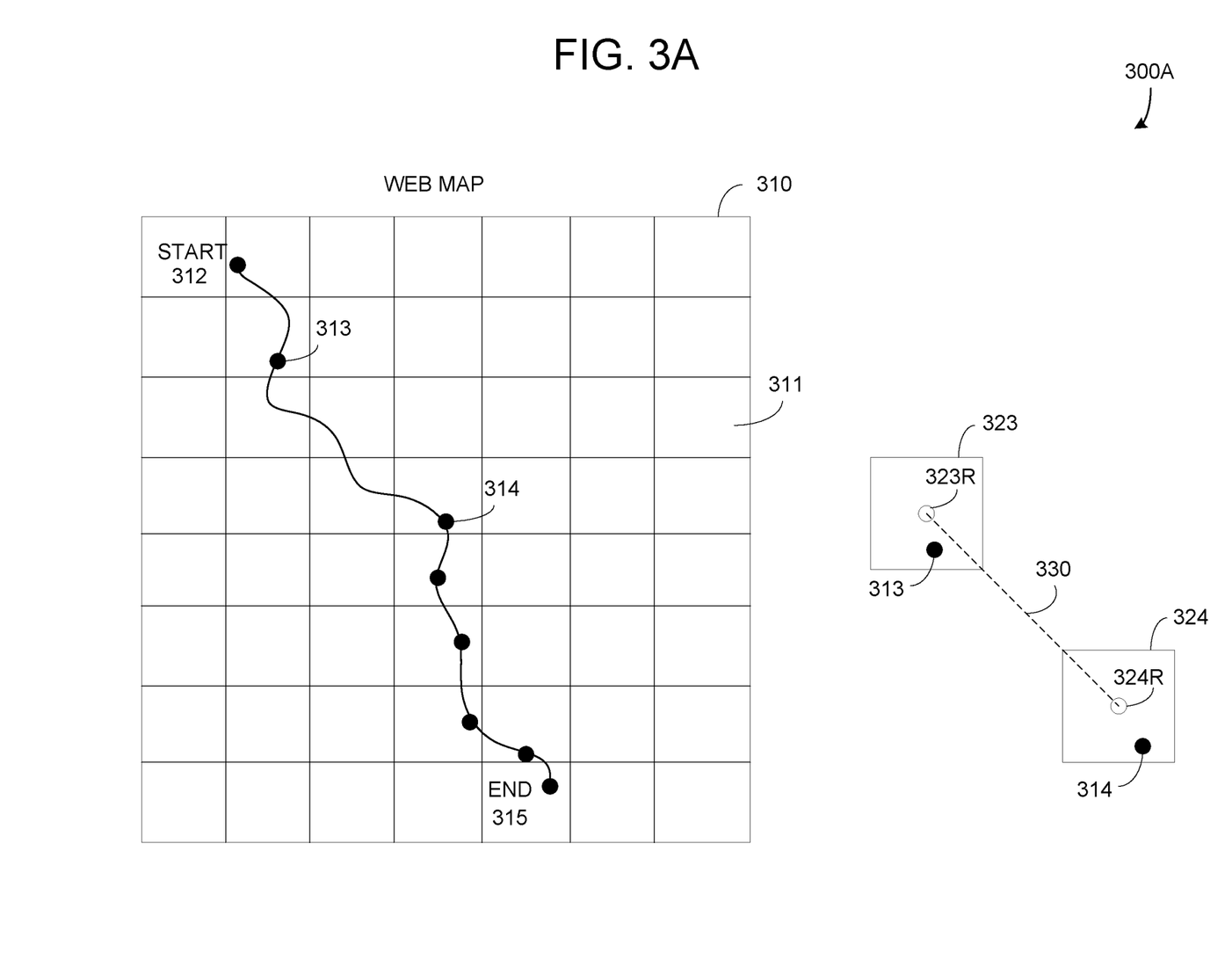
FIGS. 3A and 3B are diagrams illustrating a process of dividing a web map into a plurality of sub-areas and approximating distance determinations in accordance with an example embodiment.
Figure 3B:
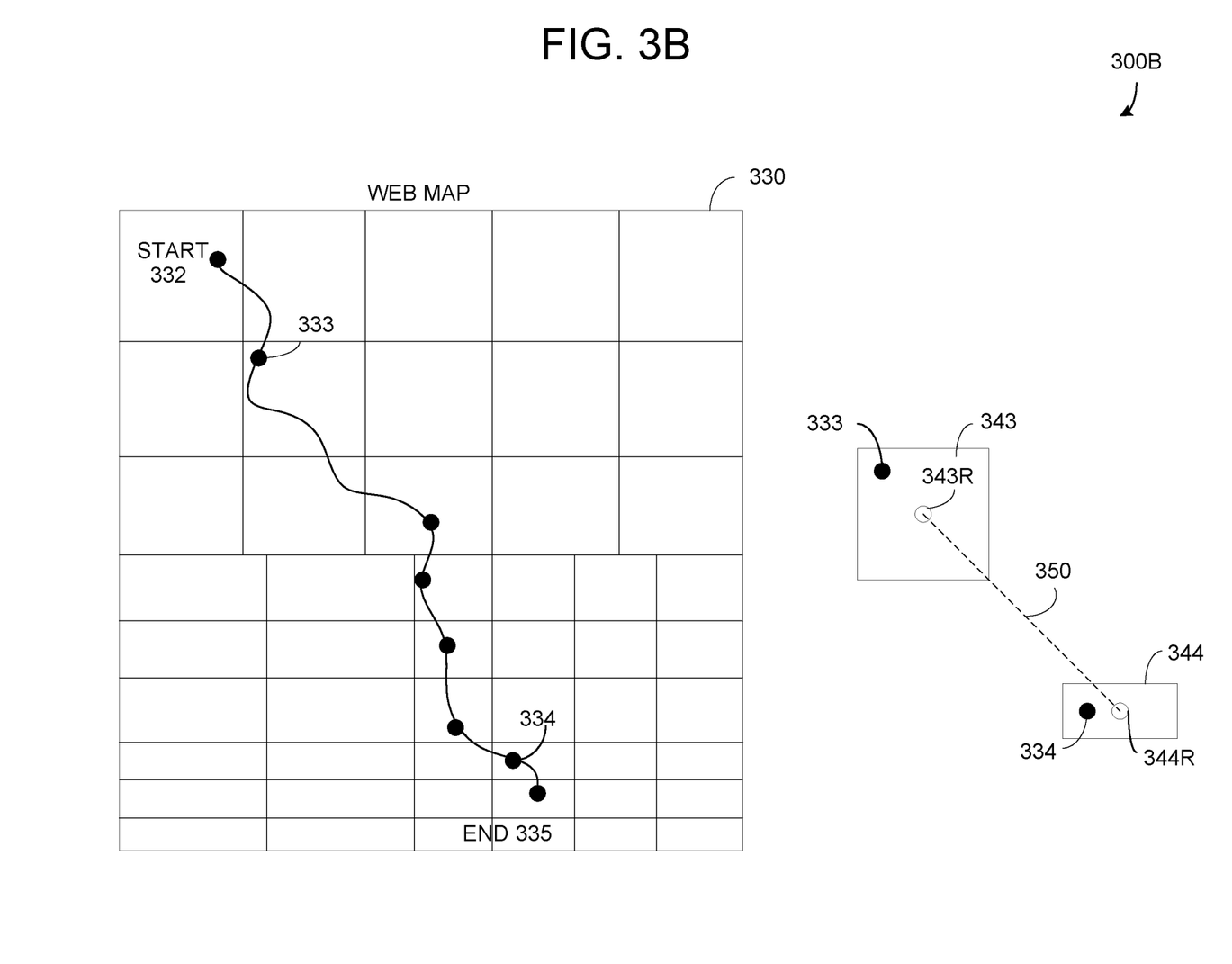

FIGS. 3A and 3B illustrate processes 300A and 300B of dividing a web map into a plurality of sub-areas (i.e., a grid) and approximating distance determinations in accordance with an example embodiment. Referring to FIG. 3A, a web map 310 may be used to geographically map roads, routes, landmarks, infrastructure, and the like. The web map 310 may integrate, store, edit, analyze, share, and display geographic information that corresponds to a real world geography. In some examples, the web map 310 may be animated or may be imagery of real-world geography. The web mapping service may receive a plurality of geographic locations that are part of a daily schedule or the like and output points on the web map 310 that correspond to the geographic locations. In the example of FIG. 3A, the web map 310 includes a plurality of geographic locations including a start point 312, an end point 315, and a plurality of intermediate points including intermediate point 313 and intermediate point 314. The start point 312 and the end point 315 (as well as the intermediate points) may be dynamically determined by the optimizer based on optimum routes between points on the web map. In order to generate a schedule, the schedule optimizer may determine an optimum route between the points on the web map.

The software described herein may divide the web map 310 into a plurality of zones also referred to as sub-areas 311. The grid may be built during a pre-processing stage prior to determining technician schedules. In some embodiments, the sub-areas may be of the same size and shape throughout the web map. As another example, the sub-areas may be different in size, shape, and/or the like. In the example of FIG. 3A, the sub-areas are the same size and shape. Representative points may be determined for each sub-area. For example, the representative points may be determined in response to dividing the web map 310 into the sub areas. In this example, the representative points may represent arbitrary locations within each sub-area such as a centroid/center, a corner, random point, or the like. As another example, the representative points may be points that are received and processed for the first time during an initial distance determination by the web mapping service between a point in a first sub area and a point in a second sub area.

In the example of FIG. 3A, a distance between location 313 (referred to as a source location) and location 314 (referred to as a target location) is approximated using similar locations on the web map 310 but not the exact locations of the source location 313 and the target location 314. Here, source location 313 is located in sub-area 323 and target location 314 is located in sub-area 324. In this example, the sub-area 323 of the source location 313 has a representative point 323R which is positioned in the center of sub-area 323. Similarly, the sub-area 324 of the target location 314 has a representative point 324R which is positioned in the center of sub-area 324. In this example, the distance between the source location 313 and the target location 314 is approximated using an actual distance 330 between the representative point 323R and the representative point 324R. Here, the distance 330 between the representative points may be based on roads and travel routes included in the geographical web map 310 or it may be calculated as a direct distance on the web map 310 regardless of roads and travel routes. The distance 330 between representative points may be stored prior to receiving the request for the distance between the source location 313 and the target location 314.

In the examples of FIG. 3A, the representative points 323R and 324R are arbitrary locations (center points) within the geographical sub-areas 323 and 324. As another example, the representative point may be an actual point (e.g., source location or target location) of a sub-area that is received in an initial request for determining a distance between sub-area 323 and sub-area 324. These initial location points may be stored as representative points and stored in a lookup table or other spreadsheet when the grid is built. When a request for a distance is received such as from the scheduling application (e.g., optimizer), the program may identify sub-areas 323 and 324 in which the source and target locations are located, and determine to use a previous representative distance determined between the sub-areas using representative points.

FIG. 3B is similar to FIG. 3A, except in FIG. 3B, the program dynamically divides a web map 330 into a plurality of sub-areas of different sizes and shapes. As will be appreciated, the size of the sub-areas may be adjusted to fine-tune the accuracy in positions on the web map 330 where a greater amount of points exists. In FIG. 3B, the web map 330 includes a plurality of geographic locations including a start point 332, an end point 335, and a plurality of intermediate points including intermediate point 333 and intermediate point 334. In order to generate a schedule, the schedule optimizer may determine an optimum route between the points on the web map 330.

In the example of FIG. 3B, a distance between location 333 and location 334 is approximated based on a distance 350 between representative points 343R and 344R. In this example, source location 333 is located in sub-area 343 and target location 334 is located in sub-area 344. In this example, the sub-area 343 of the source location 333 has a representative point 343R which is positioned in the center of sub-area 343. Similarly, the sub-area 344 of the target location 334 has a representative point 344R which is positioned in the center of sub-area 344. In this example, the distance between the source location 333 and the target location 334 is approximated using an actual distance between the representative point 343R and the representative point 344R. The distance 350 between the representative points may be stored prior to receiving the request for the distance between the source location 313 and the target location 314.

Figure 4:
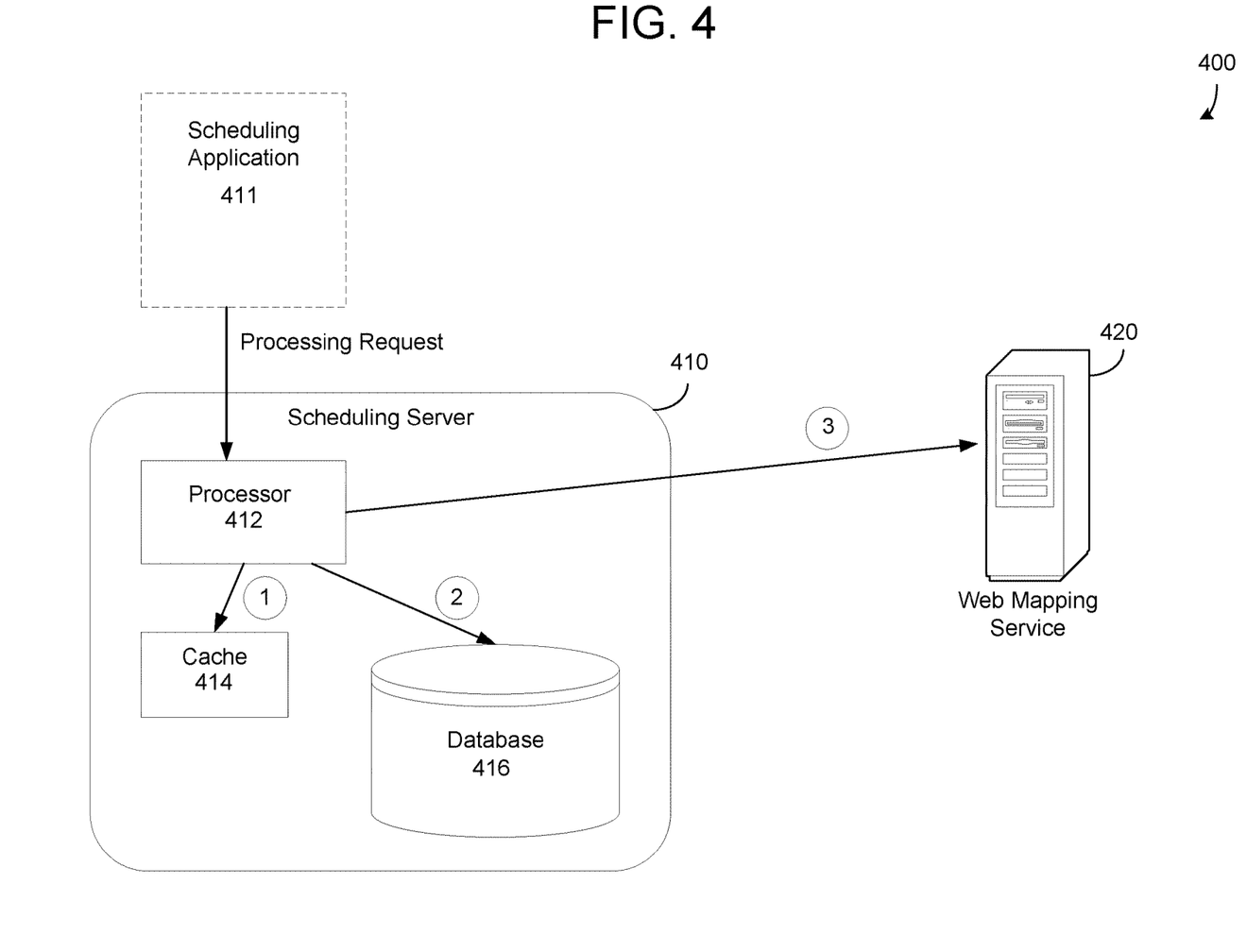
FIG. 4 is a diagram illustrating a process of retrieving distance information from a cache in accordance with an example embodiment.

FIG. 4 illustrates a process 400 of retrieving previously stored distance information from a cache 414 in accordance with an example embodiment. Referring to FIG. 4, a scheduling server 410 is executing a scheduling application 411.

The scheduling server 410 includes a processor 412, the cache 414, and a database 416. The scheduling server 410 is also connected to a web mapping service 420 via a network such as the Internet. The scheduling server 410 may store a previously determined distance between representative points (e.g., arbitrary, centers, particular locations, etc.) of sub-areas on a grid of a web map within the cache 414.

Initially, the cache 414 may be empty and may be populated over time by calls to the mapping service or during a preprocessing phase in which the grid is built. As more calls are made, the distance estimates are populated and stored in the cache. For each cell (i.e., sub-area), a distance may be determined between representative points of each cell and stored in the cache 414. In this example, the cache 414 may be populated during a preprocessing phase by the processor 412. For example, arbitrary representative points on the grid may be identified and used as representative points for the cells on the grid. Also, distances may be determined between all of the cells based on the representative points and the distances may be stored in the cache 414 for subsequent use. Accordingly, when the scheduling application 411 requests a distance between a pair of locations included in a pair of cells, the processor 412 may access the cache 414 and retrieve an estimate of the requested distance between those cells based on a previously determined distance between representative points of the two cells.

As another example, when the scheduling application 411 requests a distance between sub-areas which does not exist in the cache 414, and when the database or web mapping service return the values, if the cache 414 is already full to capacity, the cache 414 may drop some other distance value to make space for the new value that is more recently used. As another example, the cache 414 and/or the database 416 may be flushed periodically or randomly to accommodate changes in the travel times on the map. For example, average drive times between points can change as populations, traffic patterns, seasons, construction, and the like, change. So, at some frequency (may be monthly, quarterly, or annually) the system may flush old values from the database 416 and/or cache 414 so that they will be queried from the web mapping system on a subsequent run and stored back in the caching system to be more up to date. In some embodiments, the grid may also be updated in real-time after the optimizer has begun determining technicians to perform each task and schedules for each task.

The scheduling application 411 may receive a source location and a target location on a web map and issue a processing request to processor 412 to determine a distance between the source and target locations. In response, the processor 412 may identify a sub-area of the source location and a sub-area of the target location and determine whether a similar distance (e.g., between representative points of the sub-areas) has been previously stored. First, the processor 412 may check the cache 414 for the previously determined representative distance. If the previously determined distance is not present, the processor 412 may check the database 416 for the previously determined representative distance. If a previously determined distance is not present in either of the cache 414 and the database 416, the processor 412 may issue a request to web mapping service 420 in real-time to calculate the determine distance based on current conditions, etc. After the distance is gathered from the web mapping service (e.g., GOOGLE MAPS®, etc.), it may be stored in the cache 414 and/or the database 416 for use by later queries.

The grid as described herein may be built and stored in memory (e.g., the cache 414 and/or the database 416) during a pre-processing step. In this example, the data to be optimized by the optimizer (scheduling application) may be loaded to the processor in a batch. At that time, all of the representative point-to-point distances (bi-directional) may be calculated and the resulting distance and drive time values may be stored in memory (or the cache, possibly the cache is in memory). Then, when the optimizer iterates creating hundreds of solutions per iteration, it can just access the distances in the grid for each point to point travel in each solution. One of the last steps in each iteration is to assess the cost of each of the solutions in the iteration. During this cost assessment step, the grid can be queried by the application for the distances between the representative points in the cell of each work order in the chain of work orders that make up each technician's route.

Figure 5:
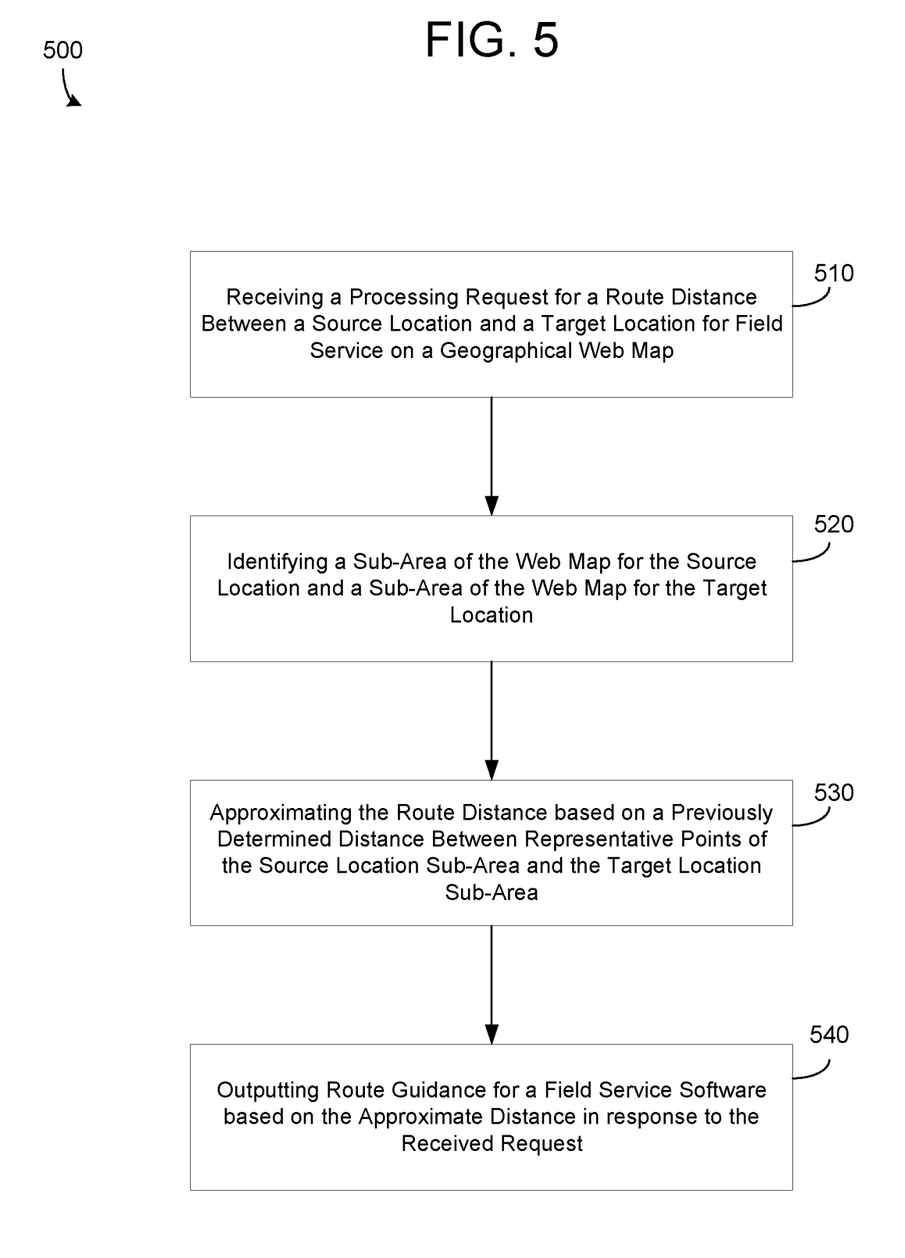
FIG. 5 is a diagram illustrating a method for determining a distance between locations on a web map in accordance with an example embodiment.

FIG. 5 illustrates a method 500 for determining a distance between locations on a web map in accordance with an example embodiment. For example, the method 500 may be performed by a web server, a scheduling application, a web mapping service, a cloud platform, a database, a user device, and the like. Referring to FIG. 5, in 510, the method includes receiving a processing request from a field service software application for a route distance between a source field service location (i.e., source location) and a target field service location (i.e., target location) on a geographical web map. The source location and the target location may correspond to two points among a larger set of field service locations on the geographical map. For example, each field service location may represent a field service task, a training, a lodging, a purchase, or the like, which is to be performed by a technician in a predetermined period of time. The set of points may represent a set of locations on the geographical web map including a start location, an end location, and multiple intermediate locations that the technician needs to visit, along with an order in which to visit each location.

The distances (and the points related thereto) may be calculated during a batch processing. For example, the batch process may calculate all of the bi-directional point to point distances as a pre-processing step that occurs before any attempts to iterate on the scheduling problem begin. That is, the bi-directional distances between all pairs may be determined as a pre-processing step to the scheduling optimization. In this example, the distance determination is not working with just one source and one target at the point of cost assessment. Rather, the output may be accessed by the cost assessor as each solution generated up by the scheduling engine is evaluated.

In some embodiments, although not shown in FIG. 5, the method may include dynamically dividing an area of the geographical web map into a plurality of smaller sub-areas including the sub-area of the source location and the sub-area of the target location based on a dispersal of the plurality of locations within the area. For example, an area of the map that has more points may be divided into finer (i.e., smaller sub-areas) while an area of the map that has less points may be divided into a coarser (i.e., larger sub-areas). The dividing may be performed prior to receiving the processing request in 510. As another example, the dividing may be performed when a memory storing the web map and the plurality of points is flushed.

In 520, the method includes identifying a sub-area of the geographical web map in which the source location is geographically located and identifying a sub-area of the geographical web map in which the target location is geographically located. The sub-areas may be smaller geographical areas within an outer boundary of the entire geographical map. The sub-areas may be of the same size and shape. As another example, the sub-areas may have different sizes and/or shapes. In some embodiments, the method may further include detecting that a previously determined distance has been determined between a representative point of the sub-area of the source location and a representative point of the sub-area of the target location. In this example, the method may also include determining the distance between the representative point of the sub-area of the source location and the representative point of the sub-area of the target location in response to a previous processing request, in response to a memory flush, a reset, and the like.

In 530, the method includes approximating the distance between the source location and the target location based on the previously determined distance between a representative point of the sub-area of the source location and a representative point of the sub-area of the target location. In 540, the method includes outputting route guidance to the field service software application based on the approximate route distance between the source location and the target location in response to the request. In some embodiments, the representative point of a sub-area may include a center of the sub-area of the source location or some other point within the sub-area which may be random or specifically determined. As another example, the representative point of the sub-area may include a source/target location of a previous processing request. The method may further include retrieving the previously determined distance between the representative point of the sub-area of the source location and the representative point of the sub-area of the target location from a local cache.

Figure 6:
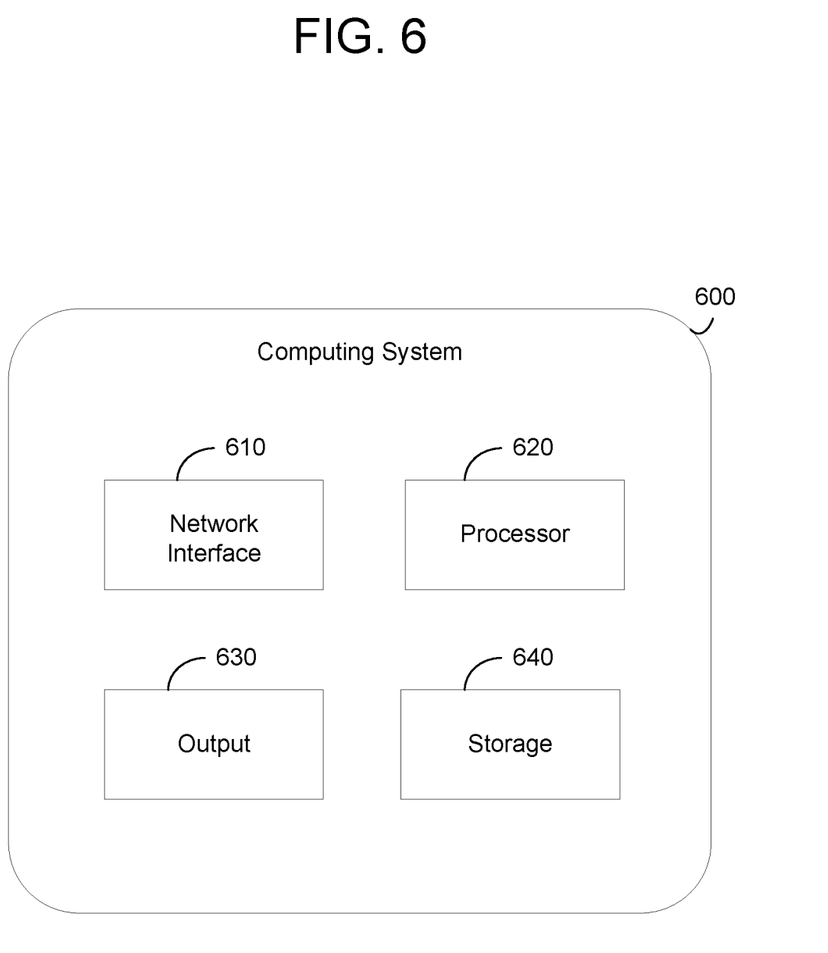
FIG. 6 is a diagram illustrating a computing system for determining a distance between locations on a web map in accordance with an example embodiment in accordance with an example embodiment.

FIG. 6 illustrates a computing system for determining a distance between locations on a web map in accordance with an example embodiment. For example, the computing system 600 may be a database, cloud platform, streaming platform, user device, and the like. As a non-limiting example, the computing system 600 may be the host platform 120 shown in FIG. 1 which hosts a scheduling application. In some embodiments, the computing system 600 may be distributed across multiple devices. Also, the computing system 600 may perform the method 500 of FIG. 5. Referring to FIG. 6, the computing system 600 includes a network interface 610, a processor 620, an output 630, and a storage device 640 such as a memory. Although not shown in FIG. 6, the computing system 600 may include other components such as a display, an input unit, a receiver, a transmitter, and the like.

The network interface 610 may transmit and receive data over a network such as the Internet, a private network, a public network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The output 630 may output data to an embedded display of the computing system 600, an externally connected display, a display connected to the cloud, another device, and the like. The storage device 640 is not limited to a particular storage device and may include any known memory device such as RAM, ROM, hard disk, and the like, and may or may not be included within the cloud environment. The storage 640 may store software modules or other instructions which can be executed by the processor 620 to perform the method 500 shown in FIG. 5. Also, the storage 640 may store software programs and applications which can be downloaded and installed by a user. Furthermore, the storage 640 may store and the processor 620 may execute an application marketplace that makes the software programs and applications available to users that connect to the computing system 600.

According to various embodiments, the processor 620 may receive a processing request from a field service software application for a route distance between a source location and a target location on a geographical web map. Here, the source location and the target location may correspond to points within a set of points on a web map that relate to a schedule such as a technician schedule that includes work orders, training, overnight stays, or the like. The source location and the target location may be successive points on the schedule, start and end points, intermediate points, or the like. The processor 620 may identify a sub-area of the geographical web map in which the source location is geographically located and identify a sub-area of the geographical web map in which the target location is geographically located, and approximate the distance between the source location and the target location based on a previously determined distance between a representative point of the sub-area of the source location and a representative point of the sub-area of the target location. Furthermore, the output 630 may output route guidance to the field service software application based on the approximate distance between the source location and the target location in response to the request. For example, the output 630 may output the approximated distance to another application (e.g., scheduling application) executing on the computing system 600 or another device via the network interface 610.

In some embodiments, the processor 620 may divide an area of the geographical web map into a plurality of smaller sub-areas including the sub-area of the source location and the sub-area of the target location. For example, the processor 620 may uniformly divide the area into equal sized shapes. As another example, the processor 620 may dynamically divide the area of the geographical web map into a plurality of smaller sub-areas having different shapes and/or sizes based on a dispersal of the locations that need to be scheduled. Here, the locations may include a start location, an end location, and multiple intermediate locations, and the source location and the target location correspond to different intermediate locations, or start/end locations, or the like.

In some embodiments, the processor 620 may determine the distance between the representative point of the sub-area of the source location and the representative point of the sub-area of the target location in response to a previous processing request. In this example, the processor 620 may store the previously determined distance in a cache or a database of the storage 630, and retrieve the previously determined distance in response to a current processing request. In some embodiments, the representative point of a sub-area may include a center of the sub-area of the location. As another example, the representative point of the sub-area may include a location (e.g., source or target) of a previous processing request.

The example embodiments provide for a more accurate distance computations than the Haversine algorithm resulting in more accurate driving distances between resources and work orders. The example embodiments reduce the number of calls/requests made to the web mapping service (GIS) which can directly improve the systems operating performance and reduce costs, and the system can cache distances between two points so that they can be reused in incremental job runs and by different services in a same location. When a high number of route distance determinations are needed, the system is able to use the cache to fetch data in a significantly faster amount of time than if the system were to access the GIS service.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computer-implemented method comprising:
    receiving a processing request from a software application for a route distance between a source location and a target location on a geographical web map;
    identifying a sub-area of the geographical web map in which the service location is geographically located and a sub-area of the geographical web map in which the target location is geographically located;
    identifying, via a cache, a distance determination between a similarly-located source location included in the sub-area of the source location and a similarly-located target location included in the sub-area of the target location, which is previously determined by a web mapping service; and
    outputting route guidance to the software application based on the previous distance determination between the similarly-located source location and the similarly located target location determined by the web mapping service in response to the processing request.

2. The computer-implemented method of claim 1, further comprising dividing an area of the geographical web map into a plurality of smaller sub-areas including the sub-area which includes the source location and the sub-area which includes the target location.

3. The computer-implemented method of claim 1, further comprising determining the distance between the similarly-located source location and the similarly-located target location in response to a previous processing request.

4. The computer-implemented method of claim 1, wherein the similarly-located source location comprises a center of the sub-area which includes the source location, and the similarly-located target location comprises a center of the sub-area which includes the target location.

5. The computer-implemented method of claim 1, further comprising optimizing a daily route schedule based on the previous distance determination and at least one of the following additional factors: time constraints, technician expertise, availability of equipment, and customer preferences.

6. The computer-implemented method of claim 1, wherein the geographical map comprises a plurality of locations including a start location, an end location, and multiple intermediate locations, and the source location and the target location correspond to different intermediate locations.

7. The computer-implemented method of claim 6, further comprising dynamically dividing an area of the geographical web map into a plurality of smaller sub-areas including the sub-area of the source location and the sub-area of the target location based on a dispersal of the plurality of locations within the area.

8. The computer-implemented method of claim 1, further comprising retrieving the previously determined distance determination between the similarly-located source location and the similarly-located target location from the cache.

9. A computing system comprising:
    a processor configured to
        receive a processing request from a software application for a route distance between a source location and a target location on a geographical web map,
        identify a sub-area of the geographical web map in which the source location is geographically located and identify a sub-area of the geographical web map in which the target location is geographically located, and
        identify, via a cache, a distance determination between a similarly-located source location included in the sub-area of the source location and a similarly-located target location included in the sub-area of the target location, which is previously determined by a web mapping service; and
    an output configured to output route guidance to the software application based on the previous distance determination between the similarly-located source location and the similarly-located target location determined by the web mapping service in response to the processing request.

10. The computing system of claim 9, wherein the processor is further configured to divide an area of the geographical web map into a plurality of smaller sub-areas including the sub-area which includes the source location and the sub-area which includes the target location.

11. The computing system of claim 9, wherein the processor is further configured to determine the distance between the similarly-located source location and the similarly-located target location in response to a previous processing request.

12. The computing system of claim 9, wherein the similarly-located source location comprises a center of the sub-area which includes the source location, and the similarly-located target location comprises a center of the sub-area which includes the target location.

13. The computing system of claim 9, wherein the processor is further configured to optimize a daily route schedule based on the previous distance determination and at least one of the following additional factors: time constraints, technician expertise, availability of equipment, and customer preferences.

14. The computing system of claim 9, wherein the geographical map comprises a plurality of locations including a start location, an end location, and multiple intermediate locations, and the source location and the target location correspond to different intermediate locations.

15. The computing system of claim 14, wherein the processor is further configured to dynamically divide an area of the geographical web map into a plurality of smaller sub-areas including the sub-area which includes the source location and the sub-area which includes the target location based on a dispersal of the plurality of locations within the area.

16. The computing system of claim 9, wherein the processor is further configured to retrieve the previously determined distance determination between the similarly-located source location and the similarly-located target location from the cache.

17. A non-transitory computer readable medium having stored therein instructions that when executed cause a computer to perform a method comprising:
   receiving a processing request from a software application for a route distance between a source location and a target location on a geographical web map;
   identifying a sub-area of the geographical web map in which the source location is geographically located and a sub-area of the geographical web map in which the target location is geographically located;
   identifying, via a cache, a distance determination between a similarly-located source location included in the sub-area of the source location and a similarly-located target location included in the sub-area of the target location, which is previously determined by a web mapping service; and
   outputting route guidance to the field service software application based on the previous distance determination between the similarly-located source location and the similarly-located target location determined by the web mapping service in response to the processing request.

18. The non-transitory computer readable medium of claim 17, wherein the method further comprises dividing an area of the geographical web map into a plurality of smaller sub-areas including the sub-area which includes the source location and the sub-area which includes the target location.

* * * * *